United States Patent
Kawabe et al.

[11] 3,762,776
[45] Oct. 2, 1973

[54] BRAKE PRESSURE REGULATOR

[76] Inventors: Tsuneo Kawabe; Shinji Kawai, both of c/o Aisin Seiki Kabushiki Kaisha 1, Asachi-machi 2-chome, Kariya city, Japan

[22] Filed: Mar. 23, 1971

[21] Appl. No.: 127,247

[30] Foreign Application Priority Data
March 2, 1970 Japan..........................45/25083
March 18, 1971 Japan..........................46/15656

[52] U.S. Cl................................. 303/22 R, 188/195
[51] Int. Cl................................. B60t 8/22
[58] Field of Search.................... 180/100; 188/195, 188/349; 303/6 C, 22

[56] References Cited
UNITED STATES PATENTS
| | | | |
|---|---|---|---|
| 3,149,886 | 9/1964 | Dorner | 303/22 A |
| 3,362,758 | 1/1968 | Goerke et al. | 303/22 R |
| 3,405,978 | 10/1968 | Lepelletier | 303/22 R |
| 3,488,095 | 1/1970 | Rath | 303/22 R X |

FOREIGN PATENTS OR APPLICATIONS
2,000,053   7/1970   Germany ........................ 188/195

*Primary Examiner*—Milton Buchler
*Assistant Examiner*—Stephen G. Kunin
*Attorney*—Pierce, Scheffler & Parker

[57] ABSTRACT

A hydraulic brake pressure regulator for varying the rear wheel brake hydraulic pressure in dependence upon changes of the vehicle load, wherein the pressure regulating operation is canceled in case of breakage of load sensing means whereby upon brake application the rear wheel brake cylinders are supplied with the same pressurized fluid as the front wheel brake cylinders.

5 Claims, 5 Drawing Figures

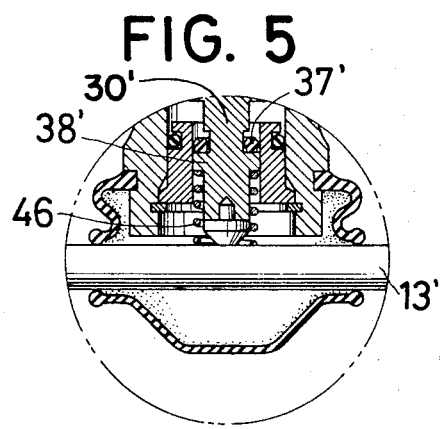
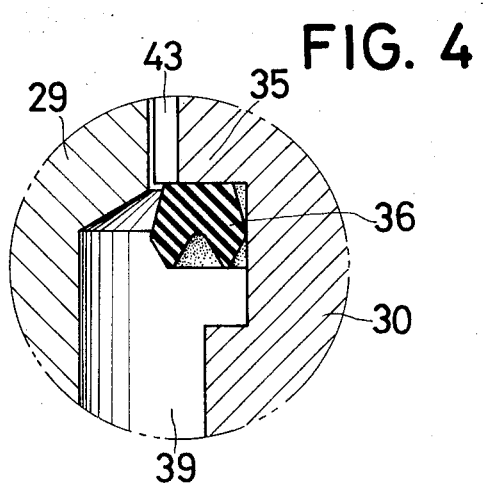
FIG. 5
FIG. 4
FIG. 2
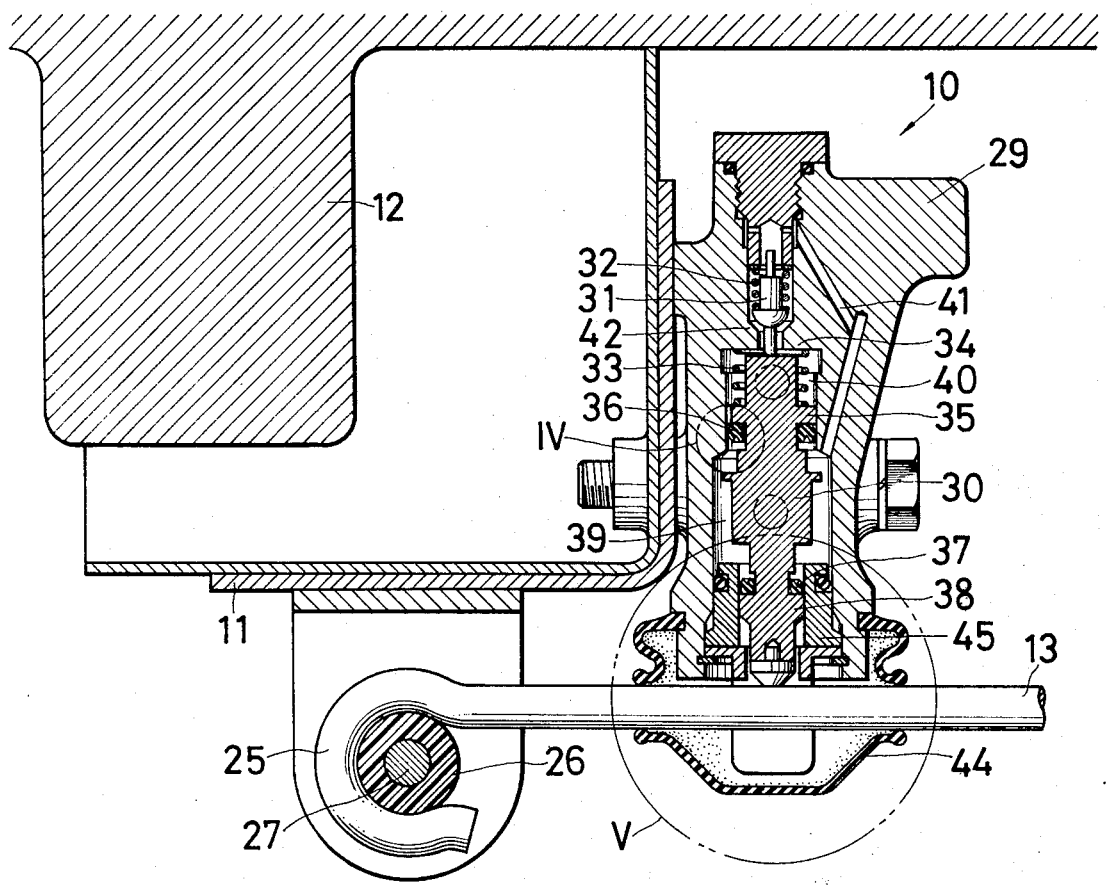

BRAKE PRESSURE REGULATOR

This invention relates to a system for controlling the hydraulic brake pressure in a wheeled vehicle, and more particularly to a brake pressure regulator interposed between a source of fluid under pressure and wheel brake means of the vehicle for varying the braking force on the vehicle wheels depending upon the vehicle load.

Upon brake application, it is desired to reduce the hydraulic pressure of the rear wheel brakes thereby preventing skid of the rear wheels. In addition, it is also desired to vary the braking force on the vehicle wheels depending upon the variable wheel load since little or no loaded vehicle requires relatively little hydraulic brake pressure while a loaded vehicle requires relatively greater hydraulic brake pressure for applying the brakes. In order to accomplish the above desires there has been proposed the control system including the brake pressure regulator operatively connected to the load sensing spring member which will change the effect of a force applied onto the brake pressure regulator in response to the differences in distance between two masses which the vehicle suspension system separates from each other.

However, the control system heretofore in use as mentioned above has the disadvantage that when the load sensing spring member is broken or gets out of order no normal braking operation can be realized due to insufficient brake application pressure in the rear wheel brake cylinders as will be apparent hereinafter more in detail. Furthermore, the load sensing spring member is subject to oscillation due to running of the little or no loaded vehicle on the rough road thereby causing frequent reciprocation of a differential piston housed in the brake pressure regulator during no braking operation, the said piston cooperating with a valve means for controlling fluid communication between the source of pressurized fluid and the rear wheel brake means. This is undesirable in view of the durability of constituent elements.

Accordingly, it is an object of this invention to provide a brake pressure regulator in which normal braking force can be applied to the rear wheel brake means as well as the front wheel brake means in the event of breakage of the load sensing spring member.

It is an another object of this invention to provide a brake pressure regulator in which the differential piston is subject to no frequent reciprocation during operation.

Further objects and advantages of the invention will appear to those skilled in the art to which this invention relates from the following description of the accompanying drawings in which:

FIG. 2 is an enlarged sectional view of the brake pressure regulator of FIG. 1;

FIG. 4 is a fragmentary enlarged view of a part of the brake pressure regulator encircled by a circle IV in FIG. 2, but said brake pressure regulator being positioned in its load sensing member broken condition; and FIG. 5 is a fragmentary view of a part of the brake pressure regulator encircled by a circle V in FIG. 2, but showing a modification thereof.

Figure 1:
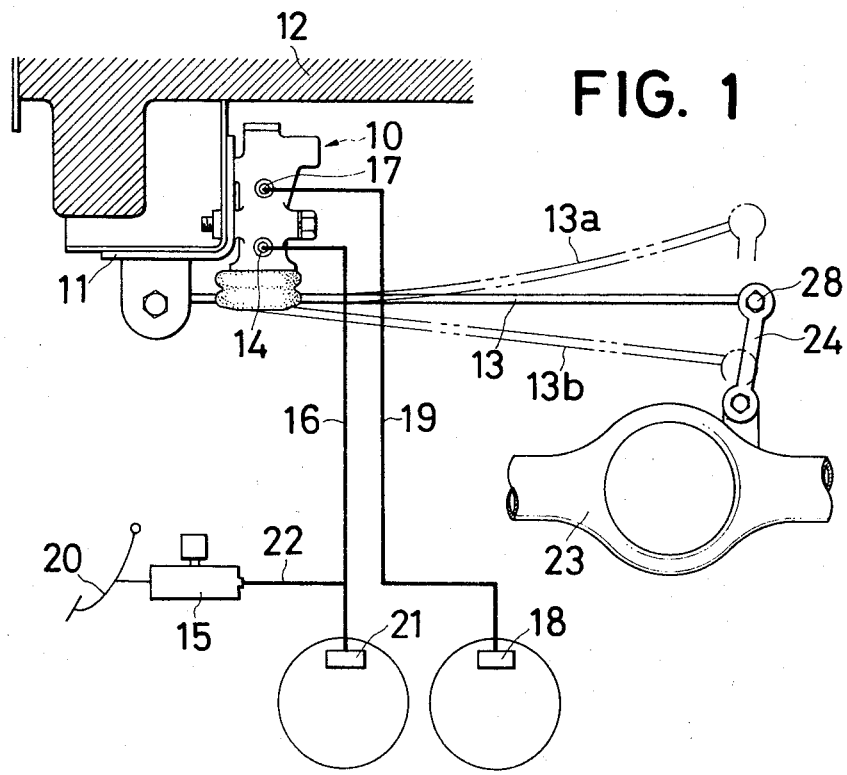
FIG. 1 is a part sectional schematic view of a brake pressure control system incorporating one form of a brake pressure regulator according to the invention.

Referring now to FIG. 1, a hydraulic brake pressure control system includes a brake pressure regulator 10 securely fitted on a bracket 11 welded to a vehicle body frame 12 and a wheel load sensing spring member 13 which is formed by a bar spring but may be formed by a leaf spring. The brake pressure regulator 10 is fluidically connected at its inlet port 14 to a master cylinder 15 via a conduit 16 and at its outlet port 17 to rear wheel brake cylinders 18 via a conduit 19. The master cylinder 15 is operable by a brake pedal 20 and fluidically connected to front wheel brake cylinders 21 via a conduit 22. In the vehicle there is provided a pair of the front and rear wheel brake cylinders, respectively, but only one is illustrated in the drawings for simplicity.

One end of the spring member 13 is connected to the bracket 11 while the other end thereof is connected to a rear wheel axle 23 through an arm 24. More specifically, as will be seen in FIG. 2, one end of the spring member 13 is formed into an eye 25 which is engaged, through a resilient bush 26, with a shaft 27 secured to the lower portion of the bracket 11, said eye 25 being rotatable around the shaft 27. Similary, the other end of the spring member 13 is formed into an eye (not shown) which is pivotable about a bolt 28 fixedly attached to the upper portion of the arm 24. The lower portion of the arm 24 is pivotally mounted on the rear wheel axle 23. The spring member 13 is installed so as to be in its neutral position as shown with solid lines in FIG. 1, in which position it has relatively little regulating effect on the regulator 10 when the vehicle load is at a middle value between the maximum and minimum. The spring member 13 may be bent to the position 13a when the distance between the vehicle body 12 and the wheel axle 23 is lessened as a result of an increase in the vehicle load, and to the position 13b as a result of a decrease in the vehicle load.

The brake pressure regulator 10 of the invention will now be described with reference to FIG. 2. The regulator 10 includes a cylinder housing 29, a differential piston 30 vertically reciprocably fitted within the cylinder housing 29, a valve member 31 normally biased downward by a first compression coil spring 32, and a second compression coil spring 33 mounted between an upper end wall 34 of the cylinder housing 29 and a large area shoulder 35 of the differential piston 30 thereby normally biasing the piston 30 downward. Thus the differential piston 30 is, in its inoperative position, normally biased downward, and is engaged with the spring member 13, so that the differential piston 30 is retained in the position shown in FIG. 2. The piston 30 is provided with an upper sealing cup 36 fitted on the shoulder 35 and a lower sealing cup 37 fitted on a reduced area shoulder 38 of the differential piston 35, whereby there are constituted a primary fluid chamber 39 normally fluidically communicated with the master cylinder 15 via the inlet port 14 of the regulator cylinder housing 29 and a secondary fluid chamber 40 normally fluidically communicated with the rear wheel brake cylinders 18 via the outlet port 17. A fluid passage 41 is formed in the cylinder housing 29 for fluid communication between the primary and secondary chambers 39 and 40. Within the secondary chamber 40 there is provided the valve member 31 cooperable with a valve seat 42 formed in the cylinder housing 29 for controlling hydraulic pressure in the rear wheel brake cylinders 18 relative to the hydraulic pressure in the master cylinder 15, said valve member 31 being normally contacted, at its lower projection, with the upper head of the differential piston 30 and spaced apart from the valve seat 42 until the hydraulic pressure in the master cylinder 15 reaches a predetermined value thereby permitting fluid communication between the master cylinder 15 and the rear wheel brake cylinders 18. The shoulder 35 is provided at its radially outer periphery with an axial slot 43 (FIG. 4) which may constitute fluid passageway between tthe primary and secondary chambers 39 and 40 when the upper sealing cup 36 is dropped to fail in sealing effect (FIG. 4). An elastic cover 44 is secured to the cylinder housing 29 for preventing the foreign material such as dirt from entering the interior of the brake pressure regulator 10. A cylindrical sleeve 45 is securely fitted within the cylinder housing 29 for permitting, at its inner wall, sliding engagement with the reduced area shoulder 38 of the piston 30.

Figure 3:
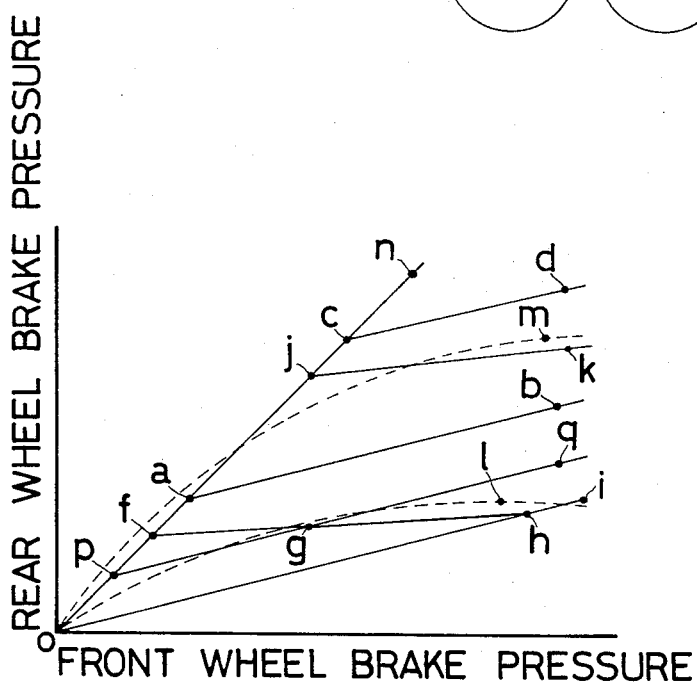
FIG. 3 is characteristic curves of the hydraulic brake pressure varied in dependence upon changes of the vehicle load.

In operation, assuming that the vehicle is partly loaded the valve member 31 wil be held open by a force acting upon the differential piston 30 in proportion to the load derived from the deflection of the spring member 13. Upon brake application, the hydraulic pressure is admitted to the front wheel brake cylinders 21 and to the rear wheel brake cylinders 18 via the brake pressure regulator 10, said hydraulic pressure flowing through the inlet port 14, the primary chamber 39, the fluid passage 41, the valve member 31 now opened, the secondary chamber 40, and the outlet port 17 into the rear wheel brake cylinders 18. When the hydraulic pressure reaches a predetermined value, the differential piston 30 is moved downward by the hydraulic pressure and exerting force of the second coil spring 33 so that the valve member 31 is seated against the valve seat 42 thereby interrupting fluid communication between the master cylinder 15 and the rear wheel brake cylinders 18. With further pressurized brake fluid, the piston 30 is moved upward to permit the valve to open thereby reestablishing fluid communication therebetween. Thus the differential piston 30 is vertically reciprocated to reduce the hydraulic pressure supplied to the rear wheel brake cylinders 18 relative to that supplied to the front wheel brake cylinders 21. It is to be noted that the hydraulic pressure value to start the piston reciprocating movement varies in dependence upon the exerting force of the spring member 13 on the valve member 31. Referring to FIG. 3, if the little or no loaded vehicle is braked in its stopped condition the schematic curve of effective brake pressure may be represented by a solid line connecting the points $o$, $a$, and $b$, while if the loaded vehicle is braked in its stopped condition the schematic curve of effective brake pressure may be represented by a solid line connecting the points $o$, $c$, and $d$. When the little or no loaded vehicle is braked in its running condition a line connecting the points $o, f, g, h$, and $i$ indicates the effective brake pressure since upon brake application the distance between the vehicle body 12 and the rear wheel axle 23 is increased to reduce a force of the spring member 13 onto the piston 30 due to transference of the vehicle load, in which the line between the points $h$, and $i$ represents a brake pressure generated when the spring member 13 applies no longer effecting force onto the differential piston 30. A solid line connecting the points $o, j$, and $k$ shows a brake pressure generated upon brake application of the loaded vehicle. It will be apparent that a dotted curved line connecting the points $o$ and $l$ shows an ideal brake pressure to be generated upon brake application of the little or no loaded vehicle while a dotted curved line connecting the points $o$ and $m$ shows an ideal brake pressure to be generated upon brake application of the loaded vehicle.

If, however, the spring member 13 is broken to be shifted downward beyond the position 13$b$ or one of the eyes thereof is out of place to cause considerable reduction of the force of the spring member 13 the differential piston 30 is lowered by the first and second coil springs 32 and 33 until engagement of the piston 30 with the plug 45. Thus the upper sealing cup 36 is also moved down thereby permitting fluid communication between the master cylinder 15 and the rear wheel brake cylinders 18 via the axial slot 43 of the piston shoulder 35 as is clearly shown in FIG. 4, at this time the valve member 31 being seated against the valve seat 42. Accordingly, upon brake application the rear wheel brake pressure regulating operation is canceled so that the hydraulic brake pressure generated in the rear wheel brake cylinders 18 will be equal to that in the master cylinder 15 as is shown in FIG. 3 by a solid line connecting the points $o, f, a, j, c$, and $n$.

It will be seen that in the conventional brake pressure regulator including a spring normally urging the differential piston upward in place of the second coil spring 33 of the invention the hydraulic brake pressure will be represented by a solid line connecting the points $o, f, g$, and $q$ in the normal brake application, however, it will be represented by a solid line connecting the points $o, p, g$, and $q$ when the load sensing spring member is broken, which results in insufficiency of the rear wheel brake pressure.

In addition, when the brake of the little or no loaded vehicle is applied in the vehicle running condition, the hydraulic rear brake pressure of the invention is more approximate to the ideal brake pressure than the conventional hydraulic rear brake pressure which may have the hazard of causing rear wheel skid.

An alternative form of the brake pressure regulator is shown in FIG. 5 which further comprises a third coil spring 46 mounted between a reduced area shoulder 38' of a differential piston 30' and a load sensing spring member 13' for normally urging the differential piston 30' upward. The third coil spring 46 which is of a stronger spring force than the first and second coil springs (not shown) even upon a little rotation of the spring member 13' in the spring force reducing direction thereof is provided for preventing frequent reciprocation of the piston 30' which is caused by running of the little or no loaded vehicle on the rough or eneven road and is unnecessary for brake pressure regulating operation, said frequent reciprocation of the piston resulting in damage of an upper sealing cup (not shown), a lower sealing cup 37', and the piston 30'. It is to be noted that when the spring member 13' is broken the third coil spring 46 no longer applies a force onto the differential piston 30' so that hydraulic brake pressure will be generated as in the previous embodiment.

What is claimed is:

1. In a hydraulic brake pressure control system having a brake pressure regulator provided in a hydraulic line between a source of fluid under pressure and wheel brake means, and a load sensing means applying a force to the brake pressure regulator thereby controlling hydraulic brake pressure to the wheel brake means in dependence upon changes of the vehicle load, the improvement of said brake pressure regulator comprising, a cylinder housing, a differential piston reciprocally fitted within said housing and responsive to the force of said load sensing means in proportion to the vehicle load, a valve means for controlling fluid communication between said source of fluid under pressure and said wheel brake means via a first fluid passage, said valve means being operable by said differential piston and normally in the open position, sealing means mounted on said differential piston for normally preventing direct fluid flow through a second fluid passage between said source of fluid under pressure and said brake wheel means, and biasing means for urging said differential piston to move against the force of said load sensing means, whereby said differential piston and associated sealing means will move beyond their normal range of movement when there is considerable reduction of force by said load sensing means and for permitting direct fluid flow through the second fluid passage between said source of fluid under pressure and said wheel brake means, said valve means being closed when said differential piston moves beyond its normal range.

2. The brake pressure regulator of claim 1 wherein said differential piston includes a larger area shoulder sealed by said sealing means and an axial circumferential slot forming said second fluid passage.

3. The brake pressure regulator of claim 1 wherein said biasing member is a coil spring mounted between said cylinder housing and said differential piston.

4. The brake pressure regulator of claim 1 and further comprising an additional biasing member for urging said differential piston in the valve opening direction against the force of said biasing member thereby preventing frequent reciprocation of said differential piston upon no brake application.

5. The brake pressure regulator of claim 1 wherein said wheel brake means are rear wheel brake cylinders of the vehicle.

* * * * *